United States Patent [19]

Shifflett

[11] Patent Number: 5,164,999
[45] Date of Patent: Nov. 17, 1992

[54] BLACKBODY FIRED ON SILICA FIBER

[75] Inventor: Peter Shifflett, Fremont, Calif.

[73] Assignee: Johnson Matthey, Inc., Valley Forge, Pa.

[21] Appl. No.: 703,003

[22] Filed: May 20, 1991

[51] Int. Cl.$^5$ .............................................. G02B 6/22
[52] U.S. Cl. ................................ 385/12; 250/227.14; 356/43; 374/131; 385/128; 385/141
[58] Field of Search .............. 350/96.10, 96.15, 96.29, 350/96.30, 96.33, 96.34; 356/43, 44; 250/227.14; 374/130, 131; 385/123, 124, 126–129, 141, 144, 145, 12, 13

[56] References Cited

U.S. PATENT DOCUMENTS

| | | | |
|---|---|---|---|
| 3,626,758 | 12/1971 | Stewart et al. | 356/44 X |
| 4,033,668 | 7/1977 | Presby | 385/95 |
| 4,576,486 | 3/1986 | Dils | 374/131 |
| 4,750,139 | 6/1988 | Dils | 250/227.23 X |
| 4,794,619 | 12/1988 | Tregay | 374/131 |
| 4,845,647 | 7/1989 | Dils et al. | 374/131 X |
| 4,887,574 | 12/1989 | Kuroiwa et al. | 123/425 |
| 4,899,741 | 2/1990 | Bentley et al. | 606/27 |
| 4,978,346 | 12/1990 | Bentley | 606/27 |

FOREIGN PATENT DOCUMENTS

| | | |
|---|---|---|
| 2021590 | 1/1991 | Canada . |
| 375399 | 12/1989 | European Pat. Off. . |
| 410851 | 7/1990 | European Pat. Off. . |
| 2045921 | 2/1980 | United Kingdom . |

OTHER PUBLICATIONS

Dakin et al., Letter, 9 *Optical and Quantum electronics* 590-4 (1977).

Primary Examiner—John D. Lee
Attorney, Agent, or Firm—Christie Parker & Hale

[57] ABSTRACT

A precious metal blackbody radiator fired on a silica or sapphire fiber is disclosed for use in an optical fiber thermometer. The fiber can be coated or uncoated. If a coated fiber is used, the fiber can be a silica or sapphire fiber, protected with an outer metallic coating, such as platinum, which may be electroplated over a thin electrically conductive film coated on the fiber. The blackbody radiator may be mounted on a first end of the fiber, and the fiber may have a second end terminating at a receptor apparatus. The blackbody may comprise semisolid platinum paste placed on a coated or uncoated fiber, dried, and fired over a flame or in a high-temperature furnace. The firing step causes strong adhesion of the blackbody to the fiber.

19 Claims, 2 Drawing Sheets

BLACKBODY FIRED ON SILICA FIBER

RELATED APPLICATIONS

This application is related to co-pending application Ser. Nos. 07/703,010, 07/703,004, (now abandoned) and 07/703,245, filed on even date herewith and assigned to a common assignee.

FIELD OF THE INVENTION

The invention relates generally to optical fiber thermometers. The invention specifically relates to optical fiber thermometers for intrinsic sensing of high temperatures with a blackbody radiator on an optically-transmissive fiber.

BACKGROUND OF THE INVENTION

In the semiconductor manufacturing industry, high-temperature furnaces are used to create semiconductor junctions and circuits by exposing semiconductor materials to chemical gases under high temperature. To regulate the desired chemical reactions, and to ensure consistent quality, accurate control of furnace temperature is required The furnace temperature may exceed 1000 degrees Centigrade.

Control may be achieved by creating a feedback loop in which a furnace temperature regulator is coupled to a temperature sensor in the furnace. The sensor detects internal furnace temperature and produces an output electrical signal proportional to the temperature. The signal is coupled to a monitor computer, or to a temperature display, enabling either manual or automatic adjustment of the furnace.

Conventionally, such temperature sensors comprise a precious metal thermocouple having a junction of two different precious metals or alloys. Heat applied to the two metals causes a thermo-electric potential difference to develop between the metals, which produces an output voltage signal. Precious metals used in conventional thermocouples may include platinum-rhodium alloys which are intrinsically temperature resistant, but which have numerous disadvantages including extremely low output voltage, susceptibility to electromagnetic interference, low signal-to-noise ratio, and slow response time.

To overcome these disadvantages, optical fiber thermometers (OFTs) have been developed. An optical fiber thermometer system may comprise a blackbody radiator on an optical fiber having a "hot" end in a furnace under test and a "cold" end coupled to receiving and decoding electronics. The blackbody radiator may be precious metal secured to the hot end of the fiber. The cold end of the fiber is coupled, outside the furnace under measurement, to a photodiode receiver assembly which includes amplification and temperature conversion electronics. Several fibers can be bundled to increase signal strength or to enable temperature sensing at several distributed locations in the furnace.

Most conventional optical fibers, such as those used in telephony and computer data transmission, cannot withstand the high temperatures of semiconductor furnaces. Therefore, some known devices employ sapphire fibers or rods, which are highly heat-resistant, which provide good optical qualities, and which enable easy affixation of a precious metal blackbody radiator. For example, U.S. Pat. Nos. 4,576,486, 4,750,139, and 4,845,647 disclose OFT systems using a high temperature sapphire fiber in a furnace coupled to a low-temperature silica fiber outside the furnace. In these patents a platinum blackbody is formed on a sapphire fiber by sputtering a coating of platinum on the fiber. However, this method is undesirable because the sputtered coating may be too thin for proper sensing. The coating or blackbody must be at least as thick as the longest wavelength of radiation to be sensed. Sputtering may produce a blackbody which is thinner than this wavelength.

U.S. Pat. No. 3,626,758 (Stewart et al.) shows a sapphire fiber for high-temperature sensing having a metallic coating sputtered on the tip which serves as a blackbody radiator.

Platinum blackbody radiators are desirable, but depositing a hot molten platinum blackbody radiator on a silica fiber will melt the fiber. Causing adhesion of a precious metal blackbody radiator on a silica fiber is difficult.

An article by J. P. Dakin and D. A. Kahn, "A novel fibre-optic temperature probe," Optical and Quantum Electronics 9 (1977), p. 540, proposes use of a single silica fiber having a maximum operating temperature of 1,100° C. for direct temperature measurement. The fiber is encased in a fine stainless steel tube and terminates in an opaque end cap comprising thin metal film, the exact composition of which is not disclosed. The reference fails to teach how to fire a platinum blackbody onto a silica fibre.

U.S. Pat. No. 4,794,619 (Tregay) shows a thermally emissive radiator cavity drilled into the end of a low-temperature fiber which may comprise glass. The cavity may be coated with an enhancing compound such as an oxide of aluminum, silicon, zirconium, or yttrium, as stated in column 5, line 17. The cavity is not a true blackbody.

U.K. Patent 2,045,921 (Dakin/Plessey) shows a temperature measuring probe with an opaque cap of thin metal acting as a black body fitted to the end of an optical fiber which is connected to a radiation detector. However, this patent does not disclose how the cap is retained on the end of the fiber. Adhesives could be used but could interfere with energy transmission.

Therefore, those who use OFT sensors desire to have a precious metal blackbody radiator on a sapphire or silica fiber for optical temperature transmission.

SUMMARY OF THE INVENTION

Accordingly, the present invention provides an optical fiber thermometer fiber with a platinum paste blackbody radiator fired thereon. The fiber can be coated or uncoated. If a coated fiber is used, the fiber can include a core and a surface coating; the core can be a sapphire or silica fiber, protected with an outer metallic coating which insulates the fiber against penetration of hydroxyl ions and thereby prevents embrittlement of the fiber. The coating may comprise platinum electroplated over a thin electrically conductive film sputtered on the fiber. The blackbody radiator may be mounted on a first end of the fiber, and the fiber may have a second end terminating at a receptor apparatus. The blackbody may comprise semisolid platinum paste placed on a coated or uncoated fiber, dried, and fired using a high-temperature furnace or flame, such as an alcohol lamp flame. The firing step causes strong adhesion of the blackbody to the fiber. The blackbody of the present invention is simple to manufacture and enables use of the superior sensing qualities of platinum in conjunction with lowcost, optically transmissive fibers which are impervious to electromagnetic interference.

DETAILED DESCRIPTION OF THE PREFERRED EMBODIMENTS

In the following detailed description of the preferred embodiments, numerous specific technical terms are used for the sake of clarity However, the disclosure is not limited to the specific terms so selected, but rather includes all technical equivalents functioning in a substantially similar manner to achieve a substantially similar result.

Figure 4:
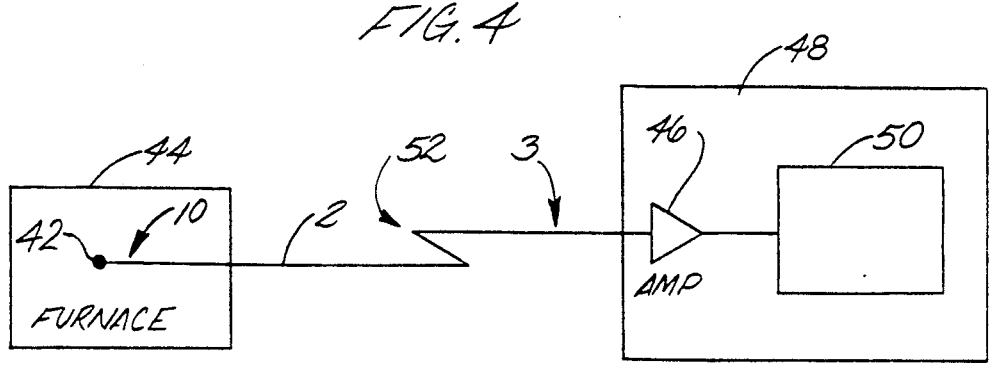
FIG. 4 is a diagram showing the blackbody of FIG. 1 in an optical fiber thermometer system.

Attention is first invited to the diagram of FIG. 4. The fiber of the invention may be arranged in an OFT system as shown in FIG. 4 which includes a semiconductor manufacturing furnace 44 and a receptor or converter 48. The fiber may include a first end 10 terminating in a blackbody radiator 42 which senses temperature in the furnace, and a second end 3 terminating at a receptor apparatus 48. The receptor may include a signal amplifier 46 and temperature data conversion electronics 50. One of ordinary skill in the art will understand that the system of FIG. 4 is exemplary and shows only essential components.

As indicated at reference number 52, the flexible fiber can bend at any point along its length. This feature permits the fiber to be retrofitted to any type of furnace or manufacturing site since the physical location or path of the fiber is not critical.

Figure 1:
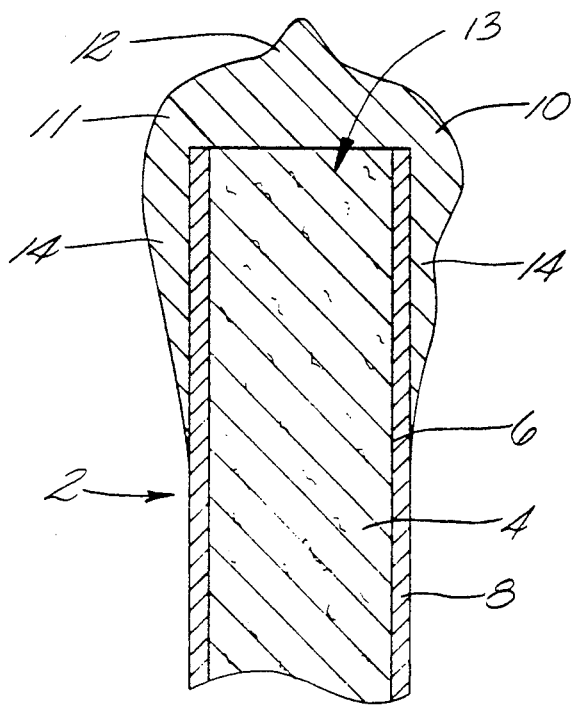
FIG. 1 is a lateral partial section view of a paste blackbody on a coated fiber of the present invention before firing of the blackbody.

FIG. 1 shows a section view of the sensing tip 2 of an optical fiber thermometer fiber of the present invention, which may be used in the system of FIG. 4. The fiber may comprise an uncoated silica or sapphire fiber, or a coated silica fiber. If a coated fiber is used, the fiber may comprise a gold-coated fiber of the type commercially available from Fiberguide Industries, Inc. of Stirling, N.J.

Gold coated fibers have recommended maximum operating temperature of 750 degrees C, which is too low for some applications. Consequently, for high-temperature operation the platinum-coated fiber disclosed in copending U.S. application Ser. No. 07/703,010 filed May 20, 1991 (entitled "Coated Optical Fiber") may be used. As shown in FIG. 1, the fiber can include a flexible light-transmissive core 4, such as a conventional silica optical fiber, and a coating means 8 can be secured on the entire exterior surface of the core, except at the fiber tip 13. The coating means may comprise a flexible metallic coating such as platinum electroplated over an electrically conductive thin film layer 6 sputtered directly on the fiber. Nickel or chromium is suitable for the thin film. This coating is impervious to hydroxyl ions and is optically opaque. When used as a coating, these metals prevent the fiber from becoming brittle through exposure to hydroxyl ions by providing a hermetic seal around the fiber. Since the coating is optically opaque, the coating also prevents unwanted external radiation from entering the fiber along the length of the fiber. Typically the diameter of a gold-coated fiber is about 275 micrometers (about 0.0108 inch) and an uncoated fiber is about 240 micrometers in diameter (about 0.0094 inch).

A fired platinum blackbody is created on the fiber by first polishing the fiber tip and placing platinum paste 11 on the fiber tip. When a coated fiber is used, the paste may be applied directly over the fiber tip. Preferably the top end 12 of the paste is somewhat thicker than the side portions 14 of the paste. The side portions primarily provide mechanical strength for good securement of the top end of the paste.

After the paste is coated on the tip, the paste is partly dried preferably using a heat gun. This drying step prevents the paste from deforming during subsequent steps.

Next, the blackbody is fired in a furnace or over a flame at a temperature just below the melting point of the metallic fiber coating. For example, if a gold-coated fiber is used, the blackbody can be fired at a temperature of about 1000 degrees C., just below the melting point of gold. For a platinum-coated fiber the blackbody can be fired at about 1700 degrees C., just below the melting point of platinum which is 1780 degrees C. The firing works with gold- or platinum-coated fibers and also with uncoated fibers. For a sapphire fiber, the firing temperature may also be 1700 degrees C.

The platinum paste may comprise type JM 7905 platinum thick film conductor, typically used in semiconductor electrode fabrication, and available from Johnson Matthey Electronics, 10350 Willow Creek Road, San Diego, Calif. 92131. The paste is a thick mixture of platinum powder in a chemical carrier solvent.

Figure 2:
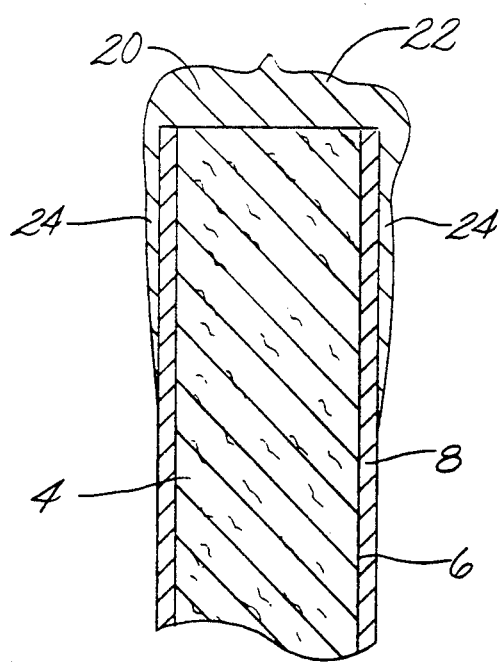
FIG. 2 is a lateral partial section view of the blackbody of FIG. 1 after firing.

After firing the thickness of the blackbody is reduced, as indicated in FIG. 2. Upon firing, solvents in the paste evaporate or are incinerated, increasing the density of the blackbody and reducing its thickness. Consequently top portion 20 and side portions 24 of the fired blackbody become approximately one-third as thick as portions 12 and 14, respectively. The length-to-width ratio of the finished blackbody is about two to one. The firing operation also causes the platinum paste to bond tightly to the fiber coating 8, insuring mechanical strength of the completed blackbody.

Figure 3:
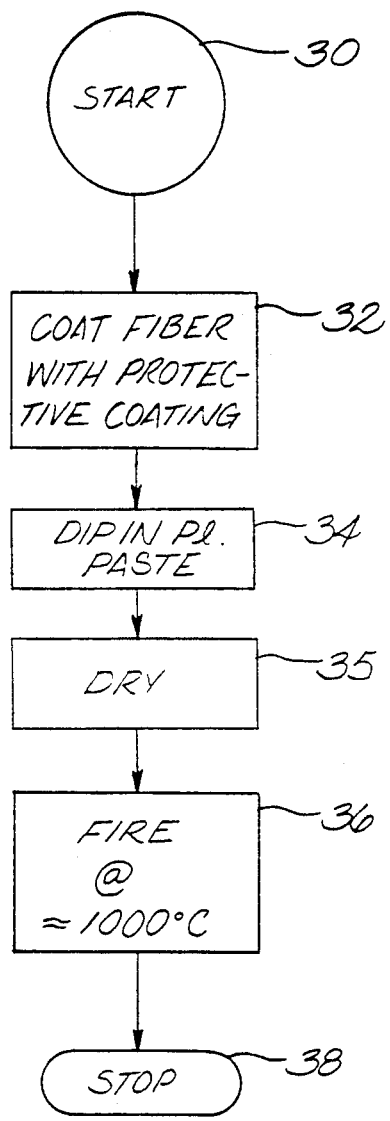
FIG. 3 is a flowchart showing process steps in a method of making the blackbody of FIG. 1.

Attention is invited to the flowchart of FIG. 3, which illustrates steps taken in the process of manufacturing a blackbody of the invention. The process begins at the step of block 30 and proceeds to the step of block 32 in which a fiber is coated with a protective metallic coating, if desired. In step 34 the fiber is coated with platinum paste, for example, by dipping the fiber tip in the paste. Thereafter the paste is dried, preferably using a heat gun, in step 35. Next the blackbody is fired in a furnace or over a flame in the step of block 36. The process ends at the step of block 38.

The present invention contemplates many variations and alternative embodiments. Thus, the scope of the present invention should not be limited to the foregoing detailed description, but rather should be determined by reference to the appended claims.

What is claimed is:

1. A temperature sensor for a low-temperature optical fiber comprising a platinum blackbody formed of platinum paste fired at a high firing temperature on a tip of the fiber, wherein the fiber comprises (a) an elongated light-transmissive core and (b) coating means for insulating the core against penetration by hydroxyl ions.

2. The sensor of claim 1, wherein the coating means comprises a flexible metallic coating secured on the core.

3. The sensor of claim 2, wherein the metallic coating comprises a first metal coated over a thin film of a second metal coated on the fiber.

4. The sensor of claim 2, wherein the high firing temperature is a temperature slightly less than a melting point of the metallic coating.

5. The sensor of claim 1, wherein the coating means is optically opaque.

6. The sensor of claim 1, wherein the coating means is impervious to hydroxyl ions.

7. The sensor of claim 1, wherein the core comprises silica.

8. An optical fiber thermometer system comprising:
(a) an enclosed high temperature source;
(b) an optically-transmissive fiber comprising a core and coating means secured thereon for insulating the core against penetration by hydroxyl ions, the fiber including a first end in the high temperature source, and a second end terminating at a receptor apparatus outside the high temperature source; and
(c) a blackbody radiator on the first end of the fiber, the blackbody comprising a precious metal fired at a high temperature on the fiber.

9. The system of claim 8, wherein the coating means comprises a flexible metallic coating secured on the core.

10. The system of claim 8, wherein the coating means comprises a first precious metal coated over a thin film layer of a second metal on the core.

11. The system of claim 8, wherein the coating means is optically opaque.

12. The system of claim 8, wherein the coating means is impervious to hydroxyl ions.

13. The system of claim 8, wherein the core comprises silica.

14. The system of claim 8, wherein the high firing temperature is a temperature slightly less than a melting point of the coating means.

15. The system of claim 8, wherein the blackbody has a thickness at least as thick as a longest wavelength of light to be sensed by the blackbody.

16. A method of making a blackbody radiator on a low-temperature optical fiber having a metallic coating bonded thereto, the method comprising the steps of
(a) placing a platinum paste on an end of the fiber;
(b) drying the paste by heating to a first temperature; and
(c) firing the paste at a high firing temperature.

17. The method of claim 16, wherein the metallic coating comprises platinum secured over a thin electrically conductive film on the fiber.

18. The method of claim 16, wherein the high firing temperature is a temperature slightly less than a melting point of the metallic coating.

19. A method of making a blackbody radiator on an optical fiber, comprising the steps of:
(a) bonding a metallic coating on the fiber;
(b) placing platinum paste on an end of the fiber;
(c) drying the paste by heating the paste to a first temperature; and
(d) firing the paste at a high firing temperature.

* * * * *